United States Patent Office 2,909,469
Patented Oct. 20, 1959

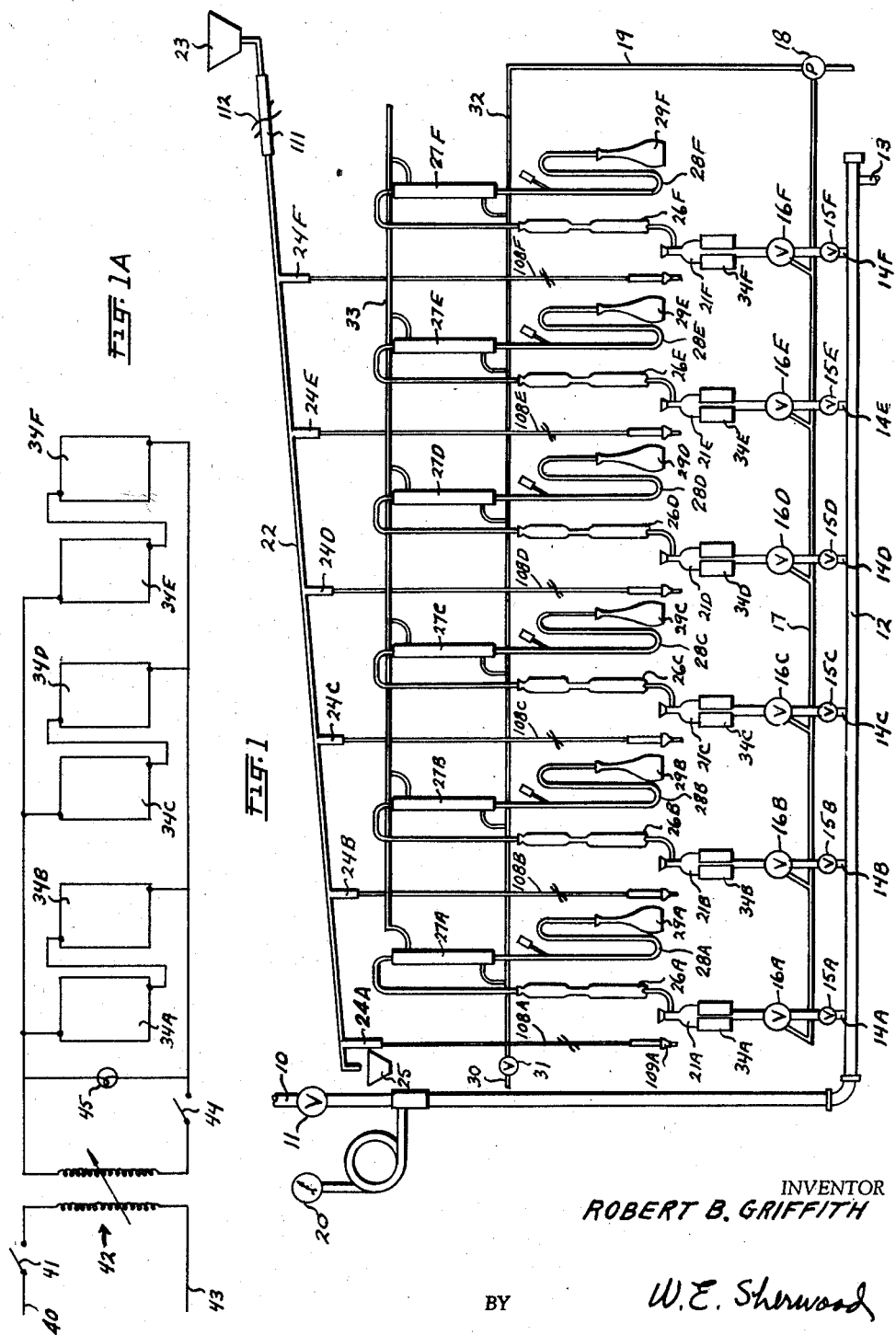

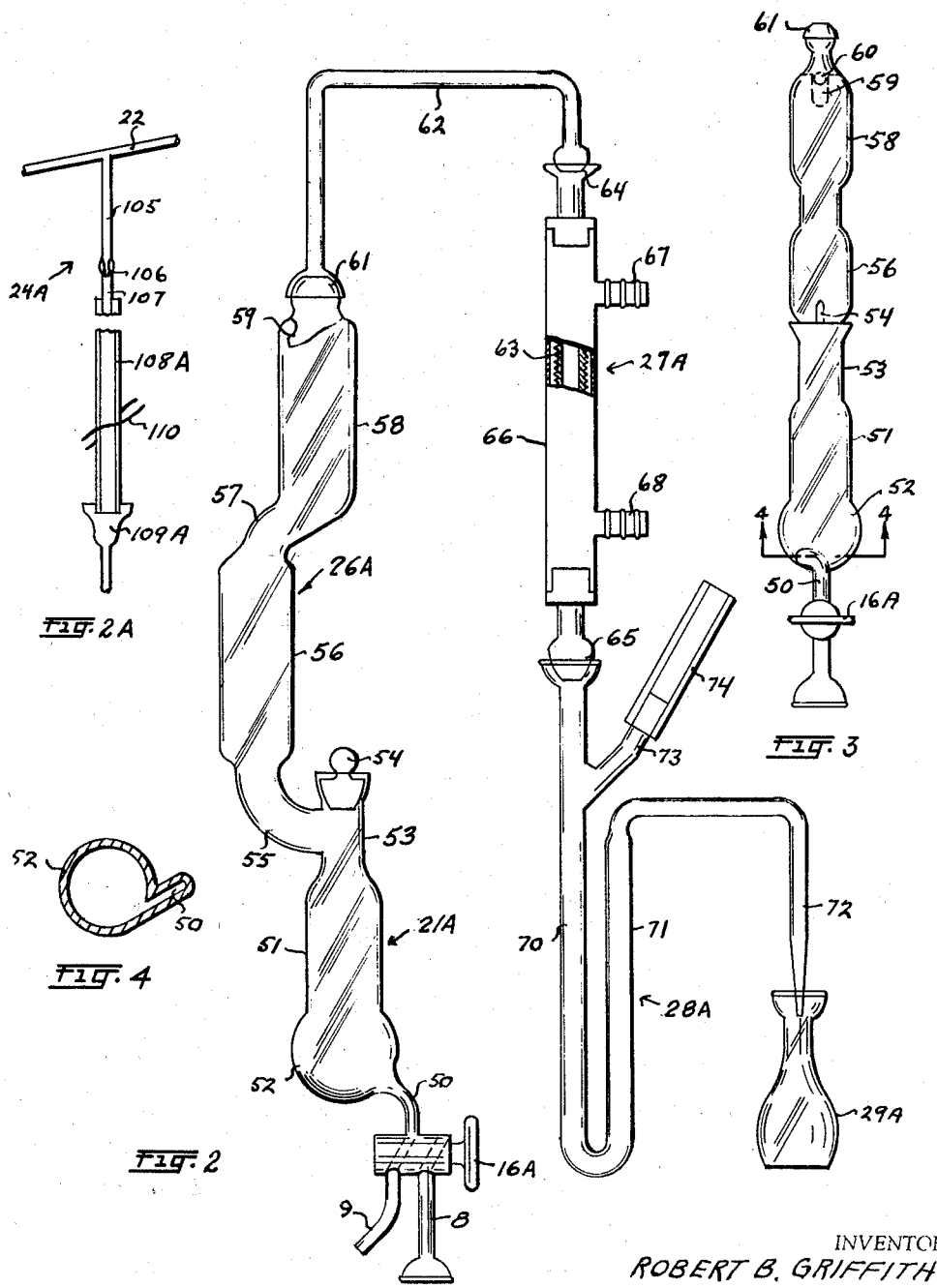

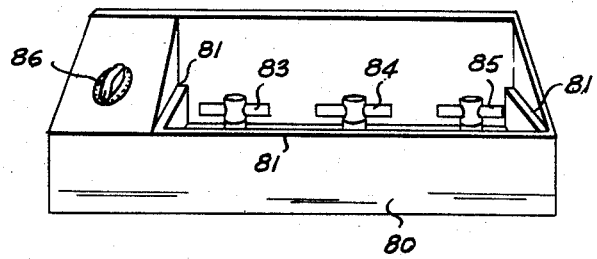
Fig. 5
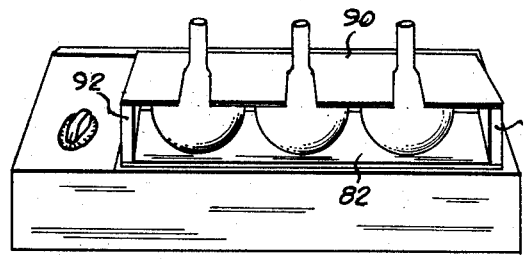
Fig. 6
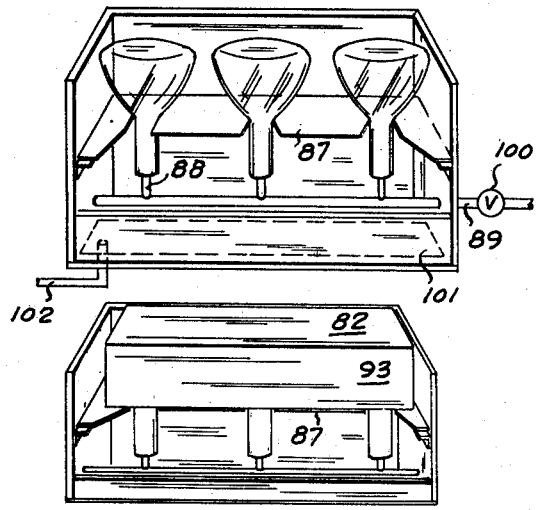
Fig. 7
Fig. 8

2,909,469

METHOD AND APPARATUS FOR RAPIDLY OBTAINING TEST SOLUTIONS

Robert B. Griffith, Lexington, Ky., assignor, by mesne assignments, to The Kentucky Research Foundation, Lexington, Ky., a corporation of Kentucky Application December 7, 1956, Serial No. 626,921

9 Claims. (Cl. 202—46)

This invention relates generally to an improved method and apparatus for rapidly obtaining test solutions. In particular, it relates to an improved batch type steam distillation still and associated apparatus through the use of which relatively unskilled laboratory personnel may rapidly and accurately prepare and analyze test solutions of various materials. As an example, the invention is disclosed as used in the determination of total alkaloid content of tobacco, although it is not limited to that usage and on the contrary may be employed in many fields of analytical chemistry.

A requirement has long existed for a method and means by which accurate small test solutions of a large number of tobacco samples can be rapidly prepared and analyzed for their alkaloid content. Information as to the nicotine content of an entire farm crop or of a large quantity of tobacco from differenct sources is of importance for example to the tobacco grower, the marketing organization and the manufacturer of the tobacco product of commerce. However, such information heretofore has been acquired in comprehensive form only after a long, laborious, and expensive analytical process.

Various efforts toward reducing the cost and expenditure of time in securing comprehensive data of this type, have been attempted, but so far as I am aware, all such efforts have been handicapped by the inherently slow analytical procedures employed and by the limitations of the apparatus being used. One attempt to improve this situation is exemplified in the steam distillation apparatus and procedure for using the same as described by R. B. Griffith and R. N. Jeffery in Analytical Chemistry, volume 20, pages 307-311, April 1948. As further described by C. O. Willits et al. in Analytical Chemistry, volume 22, pages 430–433, March 1950, the test solution provided by the Griffith et al. apparatus may be measured by spectrophotometric techniques so that the time required to determine nicotine may be reduced to 20–30 minutes of treatment for each sample in contrast with the older Association of Official Agricultural Chemists test, using silocotungstic acid which required 24–48 hours of treatment for each sample.

In contrast with these prior teachings, my invention permits relatively unskilled laboratory personnel to measure the nicotine contents of tobacco samples at a rate of about 40 samples per technician per hour, the entire elapsed time for treatment of a single sample being not more than 10 minutes.

The invention accordingly has as an object the provision of an improved method and apparatus for rapidly obtaining an accurate test solution.

Another object is to provide an improved steam distillation process for extracting nicotine from tobacco using a highly reactive alkaline extracting agent and resulting in a reduced volume of distillate required for the test as well as a reduced period of distillation.

Another object is to provide an improved steam distillation still.

Another object is to provide an improved condenser and distillate receiver structure.

Another object is to provide an improved alkali metering apparatus.

Another object is to provide an improved heating arrangement for maintaining a constant volume of distilland in the still.

Another object is to provide an improved time saving arrangement for emptying and rinsing a still.

Another object is to provide a compact, readily manipulable battery of stills for operation by a single technician.

Another object is to provide an improved flask carrier.

Another object is to provide an improved arrangement for stirring distillate.

Another object is to provide an improved arrangement for washing flasks.

Other objects and advantages will become more apparent, as the description proceeds, when considered in conjunction with the accompanying drawings showing a presently preferred apparatus for obtaining test solutions from tobacco.

In the drawings,

Fig. 1 is a diagrammatic view showing a battery of stills and associated apparatus.

Fig. 1A is a wiring diagram for the heaters employed in the apparatus of Fig. 1.

Fig. 2 is a side view of a still and associated condenser and receiver. Fig. 2A is a schematic detail of the alkali solution dispensing and metering means.

Fig. 3 is a front view of the still, foreshortened and to a smaller scale.

Fig. 4 is a sectional view on line 4—4 of Fig. 3.

Fig. 5 is a perspective view of a magnetic stirring apparatus.

Fig. 6 is a perspective view of the flask carrier in position on the stirring apparatus.

Fig. 7 is a perspective view of the flask washing apparatus and,

Fig. 8 is a perspective view of the flask carrier in position on the washing apparatus.

In general, my invention provides an improved batch type steam distillation still with associated apparatus, permitting the still to be utilized at its maximum efficiency. A battery of substantially identical stills are arranged into a unitary apparatus which preferably can be served by a single operator. The overall process for obtaining and measuring test solutions including the step of steam distillation, is coordinated in such a manner that lost motion by the operator is substantially reduced, if not entirely eliminated.

The above and other advantages of my invention will become apparent by reference to Fig. 1 showing a unit of representative apparatus. It will be understood that such a unit may be permanently mounted in a given location, such as in a conventional laboratory, or may be mounted on a portable structure to which water, electrical and steam connections may be detachably connected. For example, such a unit may be temporarily used in a tobacco warehouse, having the necessary utilities, during the marketing season, and may thereafter be removed to a laboratory for use during other periods of the year.

As indicated, a steam supply line 10 controlled by main valve 11 furnishes steam to a manifold 12 having a condensate drain 13 and to a plurality of still steam supply lines, here shown as six and indicated at 14A to 14F, inclusive. Each of these still steam supply lines is controlled by a separate selectively adjustable needle valve 15A to 15F, inclusive, and leads into the respective stopcock housings at the lower end of the stills and in which the 3-way glass stopcocks 16A to 16F, inclusive, are rotatably mounted. Each of the stopcocks is provided with a drainage connection leading to a drainage manifold 17 into which spent distilland and rinsing liquid from the stills is removed. This manifold is connected to a suitable vacuum means, such as a water aspirator pump 18 which, through a connection 19 to the condenser water supply, may continually apply vacuum to the assembly during use and without requiring an additional manipulation by the operator. A conventional pressure gage 20 indicates the pressure of steam in the manifold 12 at all times.

Prior to describing the still, an illustration of the capabilities of the apparatus is set forth.

In order to secure optimum results, I have found that accurate analyses of my test solutions may be procured with relatively small volumes of distillate. In the case of nicotine analyses, this volume preferably is in the order of 250 milliliters per sample, provided a strong alkali is used and a controlled small volume of distilland is maintained in the still at all times. The smaller the volume of distillate produced, other factors being equal, the shorter the time required for the operation. However, in order to be assured of complete extraction; and to prevent damage to the apparatus when using the hot strong alkali and the small distilland volume; and to minimize the possibility of contamination of distillate with distilland; it has been found necessary to provide a still which differs materially from the stills disclosed in the aforementioned publications.

When using the still of this invention and when employing different alkalis, results as shown in Table 1 for the distillation of nicotine and nornicotine may be attained.

and measure at 236, 259 and 282 millimicrons on the spectrophotometer. The percent of total alkaloids determined as nicotine was then calculated by the following equation, where D signifies density at the indicated wave length:

$$\text{Nicotine content} = \frac{D_{259} - \frac{(D_{236}+D_{282})}{(2)} .780}{\text{Gram sample}}$$

Referring now to Fig. 1, a battery of stills indicated at 21A to 21F, inclusive, is adapted to selectively receive an alkali solution from a supply manifold 22. A supply tank 23 connects with the manifold which is inclined and from which the several alkali dispensers 24A to 24F, inclusive, extend downwardly. At their lower ends each dispenser is equipped with a flexible dispensing tube disposed adjacent the still cover as shown at 108A to 108F, inclusive, and having a pressure clamp thereon. Each dispenser has a suitable capacity, preferably being calibrated to hold 5 ml. of alkali solution. Overflow from the dispensers beginning at 24F progressively fills succeeding dispensers and final overflow is retained in container 25 for suitable recirculation into tank 23. It will be understood that flow from tank 23 preferably occurs only when all of the dispensers are to be charged.

The details of the preferred form of the alkali solu-

TABLE I

*The percent of alkaloid obtained in the varying volumes of distillate from approximately 100 mg. samples of nicotine and nornicotine dipicrates with different alkalis*

| Volume Distilled | Nicotine Picrate | | | Nornicotine Picrate | | | |
|---|---|---|---|---|---|---|---|
| | NaOH—NaCl, 5 ml. | MgO | | NaOH—NaCl, 5 ml. | Ba(OH), 5 ml. H₂O | MgO | |
| | | 5 ml. H₂O | 20 ml. H₂O | | | 5 ml. H₂O | 15 ml. H₂O |
| 20 | 85.60 | 69.75 | 46.52 | 47.66 | 6.64 | 3.87 | 2.34 |
| 45 | 96.66 | 94.02 | 78.32 | 84.04 | 18.71 | 10.52 | 6.58 |
| 70 | 99.12 | 98.57 | 91.41 | 93.87 | 30.52 | 16.90 | 10.87 |
| 95 | 99.66 | 99.69 | 96.69 | 96.91 | 40.40 | 22.73 | 15.03 |
| 120 | 99.94 | 99.86 | | 98.35 | 48.89 | 28.24 | |
| 145 | 99.98 | 99.92 | 99.49 | 98.98 | 56.67 | 33.20 | 22.56 |
| 170 | 100.00 | 99.95 | | 99.39 | 62.92 | 37.81 | |
| 195 | | 99.97 | | 99.65 | 68.30 | 41.87 | |
| 220 | | 99.99 | | 99.78 | 73.02 | 45.67 | |
| 245 | | 100.00 | 100.00 | 99.86 | 76.87 | 49.32 | 34.99 |
| 270 | | | | 99.91 | | 52.73 | |
| 295 | | | | 99.95 | | 55.77 | |
| 320 | | | | 99.97 | | 58.77 | |
| 345 | | | | 99.99 | | 61.60 | |
| 370 | | | | 100.00 | | 64.14 | |
| 485 | | | | | 93.93 | | 56.71 |
| 495 | | | | | | 74.11 | |
| 670 | | | | | | 84.19 | |
| 725 | | | | | 98.52 | | 70.61 |
| 965 | | | | | 99.89 | | 80.30 |
| 1,205 | | | | | 100.00 | | 86.91 |
| 1,685 | | | | | | | 94.75 |

In obtaining this data not more than 20 ml. of water, and not less than 5 ml. of alkali solution, was contained in the still. It appears that the efficiency of distillation is significantly dependent upon the volume of liquid in the still. When less than 5 ml. is used, insufficient agitation results and when substantially more than 15 ml. is used, there is a danger of part of the sample being carried into the condenser. I therefore prefer to employ not less than about 5 ml. and not more than about 15 ml. distilland volume.

In the data of Table I, the nicotine and nornicotine picrate samples under test were highly purified and were weighed out in tared gelatin capsules. The heat to the stills was adjusted, as will later be described, so that there was no significant distilland volume change during the course of the distillations. The collected samples were later subjected to spectrophotometric measurement on a model DU Beckman spectrophotometer. The following procedure was used: collect about 240 ml. of distillate in a flask containing 10 ml. of approximately 3 N hydrochloric or sulfuric acid; add water to exactly 250 ml.; stir;

tion dispensing and metering means will later be described by reference to Fig. 2A.

Each still includes an offset trap system later to be described, shown at 26A to 26F, which traps communicate with condensers 27A to 27F, respectively, and which in turn direct condensate into receivers 28A to 28F, respectively, and from which the distillate flows into suitable flasks 29A to 29F, respectively. The condensers are supplied with cooling water from a line 30 controlled by valve 31 and directing water into a manifold 32 and simultaneously into vacuum pump line 19. A return manifold 33 connects with each condenser.

As a significant feature, I provide an auxiliary heater for each of the stills as shown generally at 34A to 34F, inclusive. Use of a jointly heated still and trap, as shown in the above article of Griffith and Jeffery, is not new, but I have found that by employing my improved still and by supplying regulated heat sufficient to overcome the loss of heat by the still I may eliminate the additional supply of heat to the trap. In this way, no subsequent heating is applied to distillate leaving the still.

I prefer to employ a commercially available Glass-Col electrical heater which may be readily plugged into an outlet on a supporting framework not shown, on which the entire apparatus may be supported and which may be made portable if desired.

In Fig. 1A a suitable electrical circuit for the heaters is indicated. Preferably, the adjacent heaters are series connected into pairs and with the several pairs connected in parallel. Current from lead 40 passes through master switch 41 when closed and through a variable transformer 42 into return lead 43. Upon closing of switch 44, current then passes through the several heaters as well as through indicating light 45. In general, I have found that when using a conventional 110 volt A.C. circuit, the adjusting of transformer 42 to an output of 90 volts (or 45 volts per heater) provides a heat input which prevents volume build up in the distilland during still operation.

Considering now a representative still 21A shown in drainage position (Figs. 2 and 3), it will seen that when the appropriate stop cock is turned into communication with steam inlet 8 and the valve 15A (Fig. 1) is opened, steam will be supplied to the still through a small conduit 50 entering the still in a tangential direction. As a result of this conduit arrangement, a swirling motion is imparted to the still contents during distillation and to the spent distilland rinsing liquid during the emptying of the still. Preferably, the still, traps and receivers are formed of suitable glass, such as Pyrex. Normally, glass, when in contact with hot, strong alkali, is attacked by the same, but as a result of the tangential flow of steam into the still, this attack is substantially reduced if not entirely eliminated, due to the film of steam which is thus interposed between the bottom of the still and the turbulent volume of distilland.

The still body comprises an elongated cylindrical central portion 51, for example, having an outside diameter of 3.2 cm., and terminating in an enlarged generally spherical or bulbous lower portion 52 having a diameter of about 4.1 cm.

The upper portion of the still comprises a reduced neck 53 including an aperture for the entry of material into the still and having a seat on which the removable plug 54 may be placed in order to close the aperture. The plug seats closely adjacent the lateral connection 55 thus permitting a more complete washing of the area immediately under the plug.

The heater 34A is adapted to surround the spherical portion 52 and a major part of the adjoining cylindrical portion 51 thereby to apply heat in the region of major distilland volume to compensate for all heat losses from the still. The application of further heating to the distillate after it leaves the main still portion is not required.

Leading from the neck portion 53 is connection 55 directing vapor into the bottom of a first offset trap member 56 and from the top of which a connection 57 leads vapor into the bottom of a second trap member 58 offset from the first trap member. These elements are of glass and as an example the trap members 56 and 58 may be 3.2 cm. in outer diameter and the connections 55 and 57 may be 1.6 cm. in outer diameter, the significance of the several dimensions of the still becoming apparent later.

Interiorly of the upper portion of trap 58, a conventional laterally opening outlet 59 having a breather hole 60 therein (Fig. 3), is provided for reception of the vapor to be condensed. The outlet 59 communicates through a glass ball joint 61 with an overhead conduit 62. In turn, this conduit communicates with the interior of a cylindrical condenser tube 63 formed of brass and having a deep threaded exterior central portion providing increased heat transfer surface. The condenser tube is fitted at its ends with spherical joints 64 and 65 and is surrounded with a glass shell 66 having side arms 67 and 68. The side arms respectively connect with the water manifolds 33 and 32.

Communicating with the condenser joint 65 is a U-tube receiver 28A having a first leg 70 and a second leg 71. From the second leg, a reduced, downwardly directed nozzle 72 is extended to deposit distillate into flask 29A. Adjacent the upper portion of leg 70 a side arm tube 73 having a flexible, normally open, tube extension 74 which may readily be pinched closed, is mounted. As an indication of the relatively small hold up in the thus described receiver, the legs 70 and 71 may be 1 cm. in outer diameter and approximately 20 cm. long, and the connection to nozzle 72 may be 5 mm. in outer diameter and about 10 cm. long. The volume contained in this receiver system accordingly is not enough to materially add to the time required for distillation of a sample, but on the other hand, is sufficient to provide enough liquid to rinse the still chamber as will later appear.

The apparatus as above described, is capable in the hands of experienced laboratory personnel of producing rapid and accurate test solutions. However, for the purpose of utilizing the apparatus to its full capability, I prefer to place at the disposal of the operator additional time and labor saving facilities, now to be described.

The several flasks 29A to 29F, when filled with distillate to the proper amount, are removed from their position under the nozzles and require mixing of their contents prior to spectrophotometric analysis. Also, after the proper sample for such analysis is taken, the flasks must be emptied, washed and returned for subsequent filling. Moreover, each flask is identified with a given sample under analysis and inadvertent substitution of one flask for another must be avoided. I find that the use of a special flask carrier, as illustrated in Figs. 6 to 8 provides a useful tool in the laboratory employment of my invention.

During the mixing of the flask contents, the employment of a multiple unit magnetic mixer, as seen in Fig. 5, is preferred. As shown, this mixer includes a cabinet 80 having a horizontal rim 81 around three sides, and on which the bottom 82 of the flask carrier (Fig. 6) is adapted to rest. This flask carrier comprises a top 90, end members 91 and 92, rear wall 93 and suitable recesses in the top to accommodate the necks of the flasks, while holding the bodies of the flasks within the carrier. The magnetic mixer is provided with a number of motor driven rotatable magnets, three being shown at 83, 84 and 85, and having their speed of rotation controlled by a rheostat 86. While I show only three such members and three flasks, it will be understood that the flask carrier and mixer preferably provide for the same number of flasks, as contained in the battery of stills shown in Fig. 1. By dropping a plastic covered magnet into each flask and then setting the flask carrier in place as shown in Fig. 6, all of the output from the battery of stills can be mixed simultaneously and in about 20 seconds. Following the mixing, one sample after another is taken from the respective flasks and analyzed in the spectrophotometer. After a sample is taken, the particular flask is then inverted at its proper position over a suitably drained washing cabinet, as seen in Fig. 7. Each flask is mounted in inverted position on shelf 87 with its open neck extending downwardly over a water spray nozzle fed by a water supply pipe 89, controlled by valve 100, the contents of the flask passing into the drain pan 101 having a drain outlet 102 and a screen thereover to prevent the small magnets from being washed into the drain.

Following the washing of the flasks (three being shown), the empty flask carrier is inverted and slid transversely along shelf 87 with the recesses in its top engaging the necks of the inverted flasks in the washing cabinet. Upon lifting the flask carrier upwardly, all of the flasks are removed from the cabinet simultaneously, thus saving a series of separate manipulations by the operator.

With the foregoing in mind, the method of my invention may be practiced as follows. Assuming that the determination of the total alkaloid content of a large number of samples of tobacco is desired and that a rapidly and inexpensive laboratory procedure is important, the following steps are employed.

The flasks 29A to 29F previously having been washed, each now contain about 10 ml. of 3N hydrochloric or sulfuric acid; the dispensers 24A to 24F each contain about .5 ml. of alkali solution, preferably 30% NaOH saturated with NaCl; the heaters have been properly adjusted and the stills have been adjusted for a uniform distillation rate.

The stopcock on the first unit is turned for the still to drain, as shown in Fig. 2 and the pinch tube 74 on its receiver side arm is pinched closed. Vacuum from the aspirator pump 18 then draws liquid from the receiver 28A, through the condenser 27A, into the still chamber 21A and washes the still chamber on its way to the drain. The pinch tube is then released and when the still chamber is empty, a prepared flask is placed under the receiver tip 72. The plug 54 is then removed, placed on a holding ring (not shown) and the sample of material is introduced into the still, the metered amount of alkali solution also being added to the still from the dispenser. The plug 54 is then replaced and the stopcock is turned to introduce steam into the still. The remaining units of the battery of stills are turned on in sequence using the same procedure. The steam tangentially entering a still as shown in Fig. 4 appears to form an insulating film between the glass wall and the hot, strong alkali, substantially reducing attack of the glass by the alkali. As the steam expands from the small inlet 50 into the large volume of the sphere 52, it tends to fall in temperature but heat is meanwhile being added by heater 34A, thus preventing build up of liquid in the still. The turbulence of the steam in passing through the still also effects an agitation causing intimate mixing of the alkali and tobacco. As volatiles pass upwardly through connection 55, any entrained liquid is trapped out in the offset traps 56 and 58 and refluxes into the still, thus maintaining a substantially constant volume of distilland.

Extracted alkaloids together with steam accordingly are carried overhead through conduit 62 and condensed in condenser 63. Condensate collects in the U-tube receiver under atmospheric pressure supplied through the open tube 74. As the hydrostatic head reaches the overflow nozzle 72, distillate then is collected in flask 29A.

It will be understood that immediately upon establishing distillation in still 21A, the operator, in sequence, establishes the same operation in stills 21B to 21F. Meanwhile, the several alkali dispensers are refilled for the next operation, as will later appear with reference to Fig. 2A. Although I have shown a battery of six stills, it will be obvious that any suitable number which can be tended by an operator may be used without departing from the invention. For example, a battery of ten such stills has been employed satisfactorily.

As noted from Table I, all of the nicotine is extracted in this process by the time 245 ml. of distillate are collected, even when using a relatively weak solution of alkali, such as magnesium oxide diluted in 20 ml. of water. Also, a sufficiently large amount of the much more difficultly extractible nornicotine is extracted at that time to permit an accurate nicotine analysis, as when total alkaloid content is calculated by the Willets et al. method, based upon spectrophotometric analysis. Usually the nornicotine content of most tobacco samples is less than 10% of the total alkaloid content. When the 250 ml. flask beneath the first unit to be employed approaches the volume mark, the flask is removed and placed at its properly designated position in the flask carrier. Another prepared flask is then placed beneath the receiver tip, the stopcock of the still is turned to drain position, and the pinch tube is closed. The last of the collected distillate washes the condenser and the still chamber on its way to the drain. The still is then recharged and placed into distilling operation for the next cycle.

A similar procedure is followed in turn for each of the remaining stills. If each still is adjusted for the same rate of distillation, the operator will finish changing the sample in a preceding still just as the succeeding still becomes ready for change. It has been found that an experienced operator can change the samples in six stills in about 1.5–2.0 minutes. Since a total distillation cycle normally runs about 8–10 minutes, the same operator therefore can also make the spectrophotometric readings and handle the flasks for the battery of stills. However, another operator is needed to weigh the tobacco samples when these have not been prepared in advance.

As the operator removes the flasks from the battery of stills they are placed in prescribed order in the flask carrier, the volume of each flask is adjusted to 250 ml., and a small plastic covered magnet is dropped into each flask. The loaded carrier is then placed upon the magnetic mixer and following about 20 seconds of stirring, a portion of the distillate is then taken from each flask and measured in a conventional spectrophotometer to provide the data indicated by the aforementioned formula. After taking these readings, the operator washes the flasks, adds acid thereto for the next cycle and returns them to the battery of stills. While the invention has thus been described in connection with the measuring of the alkaloid content of tobacco, it will be appreciated that it is not so limited. On the contrary, it may be used equally well in the extraction and measuring of essential oils in various materials, as well as in the general field of analytical chemistry.

Various refinements to the apparatus as described may be made without departing from the invention. For example, I may use a battery of stills mounted upon a framework having means for supporting and attaching the steam, water, electrical and vacuum connections; means for lighting the entire battery of stills; a stainless steel drainage pan for receiving drip from nozzles 72; holding rings for glass plugs 54 while the stills are being charged; lubrication of the stopcocks and glass plugs as with a high vacuum silicone grease to prevent them from freezing to their seats; and aluminum guards housing the flasks in position under the nozzles 72, all of which indicate secondary features which contribute to time savings on the part of the operator and are comprehended in the invention.

While the above indicates several secondary features, an important time saving feature of the invention resides in the particular alkali metering means which is shown in Fig. 2A and which illustrates a typical dispenser 24A. The inclined alkali solution manifold 22 has a short depending portion 105 of glass, adapted to contain a metered amount of solution, preferably 5 ml. This solution is held by the air pressure acting thereon from below the capillary region 106, which capillary may be about 3 mm. in diameter. Attached to the glass extension 107 below the capillary is an elongated flexible hose 108A hanging downwardly and with its lower end disposed over a suitable drip cup 109A. Similar drip cups are provided for the other stills as seen in Fig. 1.

A conventional clamp 110 normally holds the flexible tube closed and maintains the air pressure trapped below the capillary. When dispensing is to occur during the operation of the still, the operator swings the hose to bring its open end over the aperture in the still and opens clamp 110, whereupon the metered amount of solution flows into the still. Thereafter, the clamp is closed and the hose is returned to its position over the drip cup.

The manifold 22 is connected to supply source 23 by means of a short section of flexible hose 111 having a conventional clamp 112 (Fig. 2) cooperating therewith. It will be understood that after the several dispensers 24A to 24F have discharged their contents, the clamp 112 is released and solution is then permitted to flow into manifold 22 to the extent necessary to refill each of the dispensers for the next cycle of operation.

Therefore, while I have shown particular embodiments of the apparatus and steps of the method of my invention, it will be understood that I do not wish to be limited thereto since many modifications may be made. I therefore contemplate by the appended claims to cover any such modifications, as fall within the true spirit and scope of the invention.

What I claim as new and desire to secure by Letters Patent of the United States is:

1. In a steam distillation apparatus, a still having a generally cylindrical central portion, an enlarged generally spherical lower portion and a reduced upper portion, an aperture in said upper portion for introducing material into said still, means for selectively closing said aperture, means for removing distillate from said upper portion, including an open end receiver having a sump therein for storing a predetermined quantity of distillate for still rinsing purposes, a conduit extending tangentially from said spherical portion at one side of the vertical axis thereof for supplying steam to said still and for removing rinsing distillate and spent material therefrom, and valve means in said conduit selectively movable between a first position at which said steam is supplied and a second portion at which said rinsing distillate and spent material is removed.

2. Apparatus as defined in claim 1 including, electrical heating means disposed in substantially enveloping relation to said spherical lower portion and adjoining part of said cylindrical portion for supplying sufficient heat to compensate for all heat loss in the still, thereby to maintain a substantially constant volume of distilland.

3. In a steam distillation apparatus, a rapidly reusable self-rising batch type still having a generally cylindrical central portion, an enlarged generally spherical lower portion and a reduced upper portion, an aperture in said upper portion for introducing material into said still, means for selectively closing said aperture, means for removing distillate from and refluxing distillate into said upper portion and including an open end receiver having a sump therein for storing a predetermined quantity of distillate for still rinsing purposes, a conduit extending tangentially from said spherical portion at one side of the vertical axis of said still for supplying steam tangentially into and for removing distilland together with said predetermined quantity of rinsing distillate tangentially from said spherical portion, a steam source, a vacuum source, and adjustable control means interposed between said conduit and said sources and serving in one position to introduce steam into said still and in a second position to withdraw distilland together with said predetermined quantity of rinsing distillate from said still.

4. In a steam distillation apparatus, a plurality of rapidly serviceable stills each having a generally cylindrical central portion, an enlarged generally spherical lower portion and a reduced upper portion, an aperture in each of said upper portions for introducing material into said stills, means for selectively closing the aperture in each still, a steam manifold, conduits extending from said manifold into each still and directed tangentially into the spherical lower portions thereof and at one side of the vertical axis of said still, means for removing distillate from the upper portion of each still and including an open end receiver having a sump therein for storing a predetermined quantity of distillate for still rinsing purposes, a drain manifold valve means disposed in each of said conduits and selectively movable between a first position connecting said steam manifold to said still and a second position connecting said drain manifold to said still, and an alkali solution manifold having a plurality of dispensing means corresponding to the number of stills and holding a selected amount of material in each dispensing means, said dispensing means extending into proximity to the respective apertures in said stills for ready introduction of said material into the stills when said aperture closing means thereof is removed.

5. Apparatus as defined in claim 4 wherein said alkali solution manifold includes an inclined conduit having a supply source at its upper end and an overflow receptacle at its lower end and with said dispensing means depending from the manifold intermediate its ends.

6. A rapidly reusable batch type steam distillation apparatus comprising a still, a liquid trap connected to an upper portion of the still and offset therefrom, a condenser connected to said trap, a U-tube receiver connected at one end to said condenser and having an open distillate removal nozzle at its other end, an open side arm connected to said receiver and having a pinch tube attached thereto, an aperture in an upper portion of said still for introducing material thereinto, means for selectively closing said aperture, a conduit connected to a lower portion of said still for introducing steam into and for withdrawing rinse liquid from said still, and a control means connected in a first position to a source of steam leading to said conduit and in a second position to a source of vacuum leading to said conduit whereby when said control means occupies said first position distillation occurs with collection of condensed distillate in said receiver and when said control means occupies said second position with said pinch tube closed, distillate is removed from said receiver and drawn into said still and conduit and thence into said vacuum source thereby to rinse said still while removing spent distilland therefrom.

7. Apparatus as defined in claim 6 including a generally spherical lower portion of said still and wherein said conduit extends tangentially from said spherical portion at one side of the vertical axis of said still thereby to introduce steam into said spherical portion and to remove distilland and rinsing distillate from said spherical portion with a rapidly swirling motion.

8. Apparatus as defined in claim 6 wherein said condenser comprises a metallic tube having its open ends connected to said trap and receiver for unobstructed flow therethrough, and having a surrounding wall spaced from said metallic tube, and means for supplying and removing a condensing medium to the space between said wall and tube.

9. The method of rapidly conducting a series of steam distillations including introducing a known volume of material to be distilled into a still from the upper end thereof, agitating the distilland by introducing steam tangentially into the bottom of said still, maintaining the volume of distilland substantially constant by heating the expanding steam sufficiently to maintain a substantially constant temperature thereof in said still, collecting the distillate, interrupting the supply of steam to said still, withdrawing spent material and distilland tangentially from the bottom of said still, and refluxing a portion of the collected distillate into and out of that still to rinse said still for subsequent operation, and immediately repeating the described steps.

References Cited in the file of this patent
UNITED STATES PATENTS

| | | |
|---|---|---|
| 469,439 | Penniman | Feb. 23, 1892 |
| 875,558 | Skinner | Dec. 31, 1907 |
| 1,039,987 | Mewborne | Oct. 1, 1912 |
| 1,055,360 | Sartig | Mar. 11, 1913 |
| 1,197,142 | Mewborne et al. | Sept. 5, 1916 |
| 1,570,834 | Hess et al. | Jan. 26, 1926 |
| 1,678,636 | Cox | July 31, 1928 |
| 2,164,275 | Ittner | June 27, 1939 |
| 2,779,724 | Dunning et al. | Jan. 29, 1957 |

FOREIGN PATENTS

| | | |
|---|---|---|
| 899,344 | Germany | Dec. 10, 1953 |